US012528091B2

(12) United States Patent
Borgström et al.

(10) Patent No.: US 12,528,091 B2
(45) Date of Patent: Jan. 20, 2026

(54) CENTRIFUGAL SEPARATOR HAVING RING WITH OUTLET FLOW RESTRICTIONS

(71) Applicant: Alfa Laval Corporate AB, Lund (SE)

(72) Inventors: Leonard Borgström, Tyresö (SE); Olle Törnblom, Fårösund (SE)

(73) Assignee: ALFA LAVAL CORPORATE AB, Lund (SE)

( * ) Notice: Subject to any disclaimer, the term of this patent is extended or adjusted under 35 U.S.C. 154(b) by 796 days.

(21) Appl. No.: 17/641,524

(22) PCT Filed: Sep. 10, 2020

(86) PCT No.: PCT/EP2020/075297
§ 371 (c)(1),
(2) Date: Mar. 9, 2022

(87) PCT Pub. No.: WO2021/058287
PCT Pub. Date: Apr. 1, 2021

(65) Prior Publication Data

US 2022/0331817 A1 Oct. 20, 2022

(30) Foreign Application Priority Data

Sep. 25, 2019 (EP) .................................... 19199430

(51) Int. Cl.
*B04B 5/04* (2006.01)
*B04B 1/08* (2006.01)
(Continued)

(52) U.S. Cl.
CPC .............. *B04B 5/0442* (2013.01); *B04B 1/08* (2013.01); *B04B 11/02* (2013.01); *B04B 13/00* (2013.01); *B04B 2005/0464* (2013.01)

(58) Field of Classification Search
CPC ......... B04B 5/0442; B04B 1/08; B04B 11/02; B04B 13/00; B04B 2005/0464; B04B 5/04
See application file for complete search history.

(56) References Cited

U.S. PATENT DOCUMENTS 2,107,035 A * 2/1938 Hall ........................ B04B 11/02 494/41
3,482,771 A * 12/1969 Thylefors ................. B04B 1/18 494/71
(Continued)

FOREIGN PATENT DOCUMENTS

CN 201644237 U 11/2010
CN 105363570 A 3/2016
(Continued)

OTHER PUBLICATIONS

"Common Knowledge Evidence E1—Jet Technology and it's Applications", Beijing Technological Innovation Products Supporting Exhibition, Jet Group of Beijing University of Technology, Dec. 31. 1971, pp. 16-17 (4 pages total), with a partial English abstract.
(Continued)

*Primary Examiner* — Duane Smith
*Assistant Examiner* — Shuyi S. Liu
(74) *Attorney, Agent, or Firm* — Birch, Stewart. Kolasch & Birch, LLP

(57) ABSTRACT

A centrifugal separator for clarification of a liquid mixture into a heavy phase and a light phase, having a centrifugal separator bowl rotatable around an axis and encasing a separation space, and a sludge space radially outward of said separation space. The centrifugal separator bowl includes a hermetic inlet for feeding a liquid mixture to said separation space; a first hermetic outlet for a separated clarified light phase; and a second hermetic outlet for a separated heavy phase; a plurality of outlet conduits extending from an outer
(Continued)

position in said sludge space to said second hermetic outlet. Each of the outlet conduits has a flow restriction in the form of a nozzle or vortex diode. A method to control such a centrifugal separator, in order to provide a stable flow through said outlet conduits, is also disclosed.

20 Claims, 5 Drawing Sheets

(51) Int. Cl.
*B04B 11/02* (2006.01)
*B04B 13/00* (2006.01)

(56) References Cited

U.S. PATENT DOCUMENTS 3,983,257 A 9/1976 Malmberg et al.
5,041,075 A * 8/1991 Bruning ................ B04B 11/082 494/4
6,319,186 B1 11/2001 Pitkämäki
6,468,574 B1 10/2002 Zettier
7,837,608 B2 11/2010 Klapper et al.
8,557,316 B2 10/2013 Pecoroni et al.
8,657,913 B2 * 2/2014 Pogen .................... B01D 45/14 55/467
9,186,687 B2 11/2015 Häggmark et al.
2007/0117706 A1 * 5/2007 Pitkamaki ................. B04B 1/08 494/56
2013/0029828 A1 * 1/2013 Haggmark .............. B04B 11/02 494/37
2013/0233290 A1 * 9/2013 Skoog .................... F01M 13/04 123/572
2015/0152518 A1 6/2015 Horbach et al.
2015/0190817 A1 * 7/2015 Pieralisi .................. B04B 11/05 494/48
2017/0135382 A1 5/2017 Avergård et al.
2017/0327770 A1 11/2017 Hofstedt
2018/0119617 A1 5/2018 Pulter et al.

FOREIGN PATENT DOCUMENTS

EP 3 207 995 A1 8/2017
WO WO90/00862 A1 2/1990
WO WO2011/004007 A1 1/2011
WO WO2017/005676 A1 1/2017

OTHER PUBLICATIONS

English translation of Chinese Office Action for Chinese Application No. 2020800669809, dated Sep. 26, 2023.
Japanese Office Action for Japanese Application No. 2022-519297, dated Mar. 6, 2023, with English translation.
International Search Report, issued in PCT/EP2020/075297, dated Nov. 16, 2020.
Written Opinion of the International Searching Authority, issued in PCT/EP2020/075297, dated Nov. 16, 2020.

* cited by examiner

CENTRIFUGAL SEPARATOR HAVING RING WITH OUTLET FLOW RESTRICTIONS

The present invention relates to a centrifugal separator for separation of a liquid mixture into a heavy phase and a light phase and a method to control such a centrifugal separator.

INTRODUCTION

In a centrifugal separator for clarification of beer, having a sludge space where the separated heavy phase comprising yeast is collected, the yeast is ejected through discharges by intermittently opening outlets in the periphery of the separator bowl while the clarified beer is leaving the centrifugal separator through a hermetic outlet or a paring disc outlet. As the yeast concentration in the feed to the separator is far from constant it is difficult to optimize the operation to obtain best possible result. For example, when the yeast concentration is high, when taking feed from the bottom of the yeast tanks, frequent peripheral discharges are needed to avoid overfilling of the sludge space and leading to insufficient clarification. The throughput capacity of the separator is then limited by the discharge frequency needed. The turbidity of the clarified beer is often used as input signal for triggering discharges, by using PLC-control.

An improvement of the centrifugal separator described above is disclosed in U.S. Pat. No. 9,186,687. This document describes a centrifugal separator with a first mechanically sealed outlet for the clarified liquid, a second mechanically sealed outlet for yeast concentrate and a third outlet for intermittent discharge at the periphery. The yeast concentrate is flowing into a set of pipes from a position close to the periphery in the sludge space to the second outlet. Having the yeast concentrate flowing to a second outlet, the discharge frequency can be lowered to a rate just needed to avoid plugging of the concentrate pipes. Yeast cells leaving the centrifugal separator by the second outlet, have a high probability to survive the centrifugation and may be used for the next brewing batch, while much of the yeast cells that are ejected at the intermittent discharges in the third outlet are dead and are not usable in further fermentation.

The object of the present invention is to reduce the risk of clogging in such conduits transporting heavy phase, such as yeast concentrate, from a sludge space to an outlet.

SUMMARY OF THE INVENTION

The above object is realized in a first aspect in that said centrifugal separator has a centrifugal separator bowl rotatable around an axis and encasing a separation space, and a sludge space radially outward of said separation space, comprising a hermetic inlet for feeding a liquid mixture to said separation space; a first hermetic outlet for a separated clarified light phase; a second hermetic outlet for a separated heavy phase; and a plurality of outlet conduits extending from an outer position in said sludge space o said second hermetic outlet; wherein each of the outlet conduits has a flow restriction in the form of a nozzle or vortex diode.

The inventors have found that the manifold of concentrate pipes is may be an unstable configuration in a separator described e.g. in U.S. Pat. No. 9,186,687. If one pipe gets a disturbance in yeast concentration, for instance a slightly higher yeast concentration, the concentrate of this pipe becomes denser and more viscous. This leads to a flow reduction in that pipe relative to the other pipes of the manifold. The flow reduction leads to a further increase in yeast concentration in the pipe, and as a consequence, the disturbance is self-amplifying and growing in amplitude until the concentrate pipe clogs.

In a separator bowl of a hermetic separator, low pressure drop is of essence since there are no pumping devices (paring disc/pipe) in the separator that could compensate for pressure drops within the separator. The inventors have surprisingly found that introducing flow restrictions in the form of a nozzle or vortex diode in each of the plurality of outlet conduits extending from an outer position in said sludge space o said second hermetic outlet improves stability of a separator having such conduits, i.e. it reduces the risk of the concentrate of one pipe becoming denser and more viscous. In other words, by introducing the flow restrictions, and thus a pressure drop, a more stable configuration of the manifold of outlet conduits may be achieved during operation, thereby reducing the risk of clogging.

The separator may thus be a hermetic separator with a hermetic inlet and outlet. Consequently, the separator may be free of any pairing devices for transporting a separated liquid light phase or heavy phase from the centrifugal separator bowl. The separator may thus be arranged such that the flow of separated light and heavy phases are controlled with external valves.

According to a further embodiment of the first aspect, said outlet conduits are at least partly shaped as pipes.

According to a further embodiment of the first aspect, the cross-section of said outlet conduits is circular.

According to a further embodiment of the first aspect, the flow restrictions are in the form of exchangeable pieces.

According to a further embodiment of the first aspect, the flow restrictions are formed in a ring piece having one vortex diode or nozzle for each outlet conduit.

According to a further embodiment of the first aspect, the outlet conduits continue as separated channels out to the vicinity of the outer diameter of an impeller comprising pump wheel rotating with said centrifugal separator bowl and wherein at least one flow restriction are positioned at the end of an outlet conduits at the vicinity of outer the diameter of the pump wheel. As an example, the flow restrictions of all outlet conduits may be positioned at the end of at the vicinity of the outer diameter of the pump wheel. This may be advantageous in that the pressure in the section of the smallest radius may be increased while keeping the stabilizing features of the flow restrictions.

According to a further embodiment of the first aspect, the second hermetic outlet for heavy phase has a mechanical seal of larger diameter than a mechanical seal on the first hermetic outlet for light phase.

According to a further embodiment of the first aspect, the radius of the heavy phase outlet mechanical seal, and the outer radius of the disc stack, is larger than 20%.

According to a further embodiment of the first aspect, the centrifugal separator bowl has a third outlet for intermittent discharge at its periphery.

According to a further embodiment of the first aspect, a control valve is arranged in the second hermetic outlet.

According to a further embodiment of the first aspect, a control valve is arranged in the first hermetic outlet.

According to an embodiment, the separator further comprises a control unit and at least one measuring device arranged in the second hermetic outlet measuring density and flow rate of the separated heavy phase. The at least one measuring device may be adapted to send data of the density and flow to the control unit, which may be configured for regulating the flow rate of the separated heavy phase. Thus, the separator may comprise a control valve arranged downstream of the second hermetic outlet, and the control unit may be configured for controlling the flow rate through this control valve based on the data received from the at least one measuring device.

According to a further embodiment of the first aspect, at least one measuring device is arranged in the second hermetic outlet measuring density and flow rate, which device is connected to a programmable logic controller (PLC) and adapted to send data representing density and flow rate respectively. The PLC may be adapted to process the data to determine if the combination of values of flow rate and density lies within a predetermined scope of values corresponding to a stable flow through said outlet conduits or not, wherein an actuator is adapted to manipulate one or both of said control valves in response to a correction signal sent by said PLC if said combination of values of flow rate and density does not lie within said predetermined scope.

The above object is realized in a second aspect, by a method to control a centrifugal separator, in order to provide a stable flow through said outlet conduits, combinations of values of flow rate and density of the heavy phase is established where a stable flow through said outlet conduits are maintained, the flow rate and density of the heavy phase in said second hermetic outlet are measured continuously or intermittently and compared to said combinations of values by a PLC, the flow rate in said second hermetic outlet is regulated so a stable flow is maintained.

According to a further embodiment of the second aspect, the PLC is set to follow a curve corresponding to combinations of flow rate and density in said second hermetic outlet, with a margin to a stability limit curve, under which stability limit curve the conduits may clog.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION OF THE DRAWINGS

Figure 7:
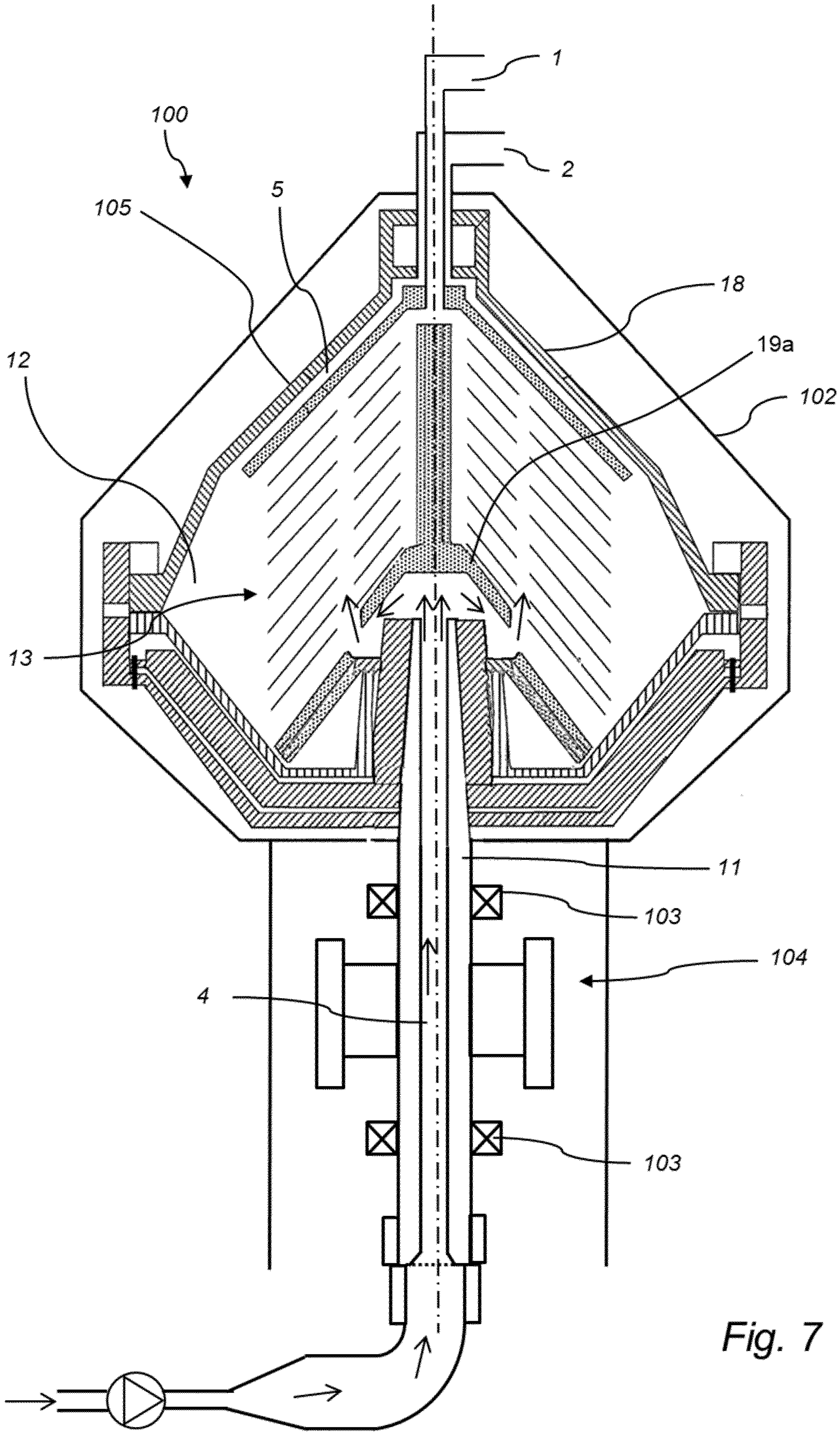
FIG. 7 illustrates a centrifugal separator in which the present invention may be applied.

FIG. 7 shows a centrifugal separator 100 for separating a fluid mixture into a light phase of clarified liquid and a heavy phase of sludge/sediment. The centrifugal separator 100 comprises a frame 102, a hollow spindle 11, which is rotatably supported by the frame 102 in a bearing arrangement 103, and a centrifugal separator bowl 18 having a rotor casing 105. The rotor casing 105 is fixedly adjoined to the axially upper end of the spindle 11 enabling a drive arrangement 104 to rotate the centrifugal separator bowl 18 together with the spindle 11 around an axis (X) of rotation. The drive arrangement 104 may be a direct drive motor where the rotor of the motor is fixed to or is a part of spindle 11 or it may involve a transmission transmitting rotational movement from a separate motor via a belt-drive or gear-drive. The rotor casing 105 encloses a separation space 106 in which a stack 13 of separation discs is arranged in order to achieve effective separation of the fluid mixture that is processed. In the center of the separator bowl 18 a distributor 19*a* is arranged coaxially to the spindle 11. The distributor 19*a* is functioning as a nave on which said stack 13 of separation discs is fitted centrally and coaxially with the rotor casing 105. The separation discs of the stack 13 have a frustoconical shape and are examples of surface-enlarging inserts. Only a few separation discs are shown but a stack 13 may for example contain above 100 separation discs, such as above 200 separation discs. In the centrifugal separator bowl 18 radially outside of said stack 13 of separation discs is a sludge space 12 for receiving the heavier content of the fluid mixture. The rotor casing 105 has a mechanically hermetically sealed liquid outlet 1 for discharge of a separated liquid light phase, and a heavy phase outlet 2 for discharge of a phase of higher density than the separated liquid light phase. There is a number of outlet conduits 5 in the form of channels for transporting separated heavy phase from the separation space 106. The channels may be in the form of separate pipes, or may be channels which form part of the bowl wall. The outlet conduits 5 extend from a radially outer position of the separation space 106 to the heavy phase outlet 2. As can be seen in better detail in FIG. 1, the outlet conduits 5 have a conduit inlet 5*a* arranged at the radially outer position and a conduit outlet 5*b* arranged at a radially inner position. Further the outlet conduits 5 are arranged with an upward tilt relative the radial plane from the conduit inlet 5*a* to the conduit outlet 5*b*. Each of the outlet conduits has a flow restriction in the form of a vortex diode 7. The flow restriction can also be simple nozzles 20 like in FIG. 2 causing a pressure drop. Flow restrictions in form of vortex diodes are preferable as these show pressure drop reduction as viscosity increase, resulting in improved stability of the manifold consisting of a plurality of outlet conduits 5. A simple a nozzle 20 has a viscosity independent pressure drop and does not work as well. Increasing pressure drop by just reducing cross section of the conduits 5 does not work as this gives increased pressure drop with increased concentration.

Figure 3:
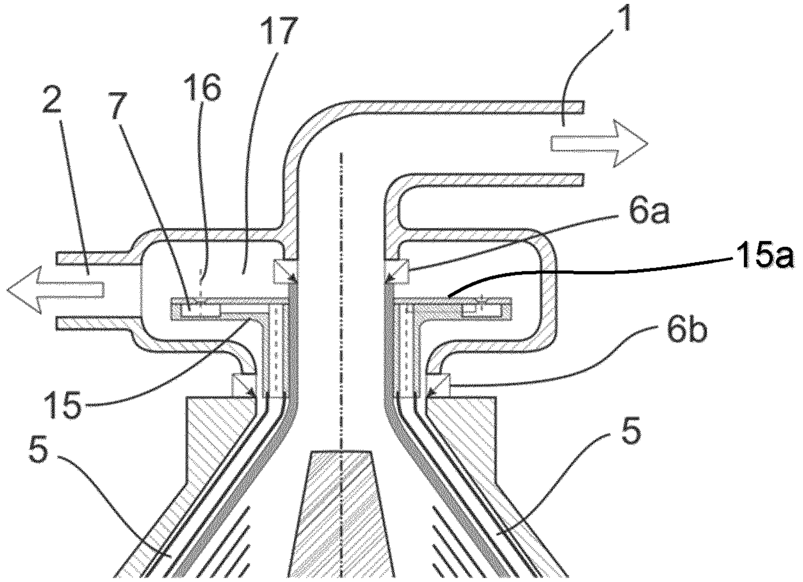
FIG. 3 illustrates a detail of yet another embodiment of the centrifugal separator according to the present invention.

In FIG. 3 the outlet conduits 5 continues as separated channels out to the vicinity of the outer diameter of an impeller 15 comprising a pump wheel 15*a* in a heavy phase chamber 17 and rotating with said centrifugal separator bowl 18, where the flow restrictions 7 in the form of vortex diodes 7 (or nozzles 20) are positioned at the end of the conduits 5 at the vicinity of outer diameter of the pump wheel 15*a*. An axis of the vortex diode 16 is perpendicular to the surface of the pump wheel 15*a*.

The vortex nozzles are thus placed in the impeller 15 close to the periphery of the impeller to reduce the risk of cavitation or degassing, especially in beer separation. The pressure in the section with the smallest radius can thus be increased while keeping the stabilizing feature of the nozzles. For this to work it is necessary that the flow paths from all concentrate tubes are kept separate all the way up to the nozzles 20.

Commonly used separator outlet pump wheels are designed as standard centrifugal pump wheels having curved vanes. A pump wheel according to the invention differs from this as the outlet conduits 5 continues as separate closed conduits all the way to the flow restriction at the outer diameter of the pump wheel. This flow restriction can be in the form of a vortex diode 7 or just a plain nozzle 20. The part of the outlet conduits 5 extending in the pump wheel can be in the form of curved channels and/or as radial channels.

Figure 1:
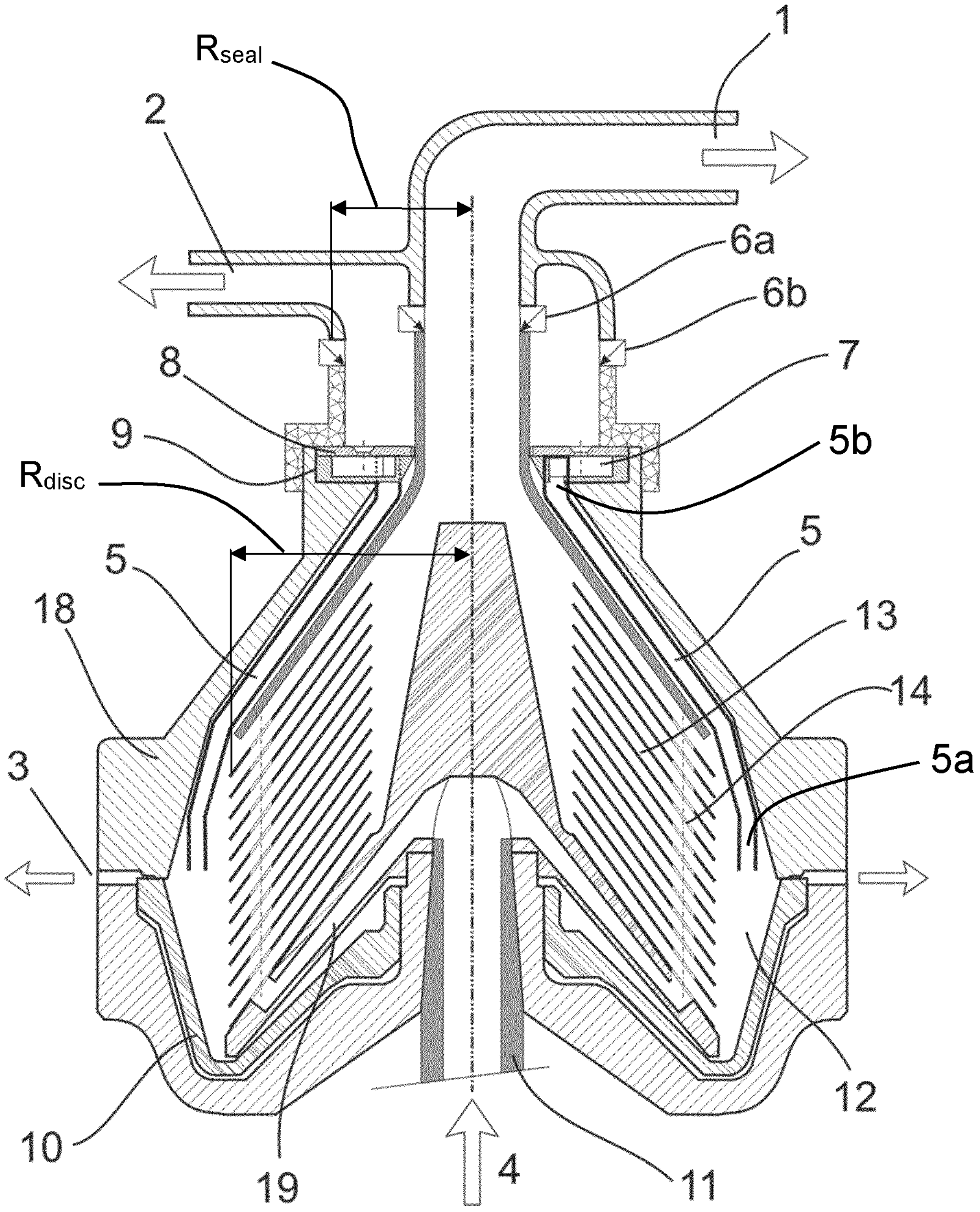
FIG. 1 illustrates a rotor of a centrifugal separator and inlet and outlets according to the present invention.
Figure 2:
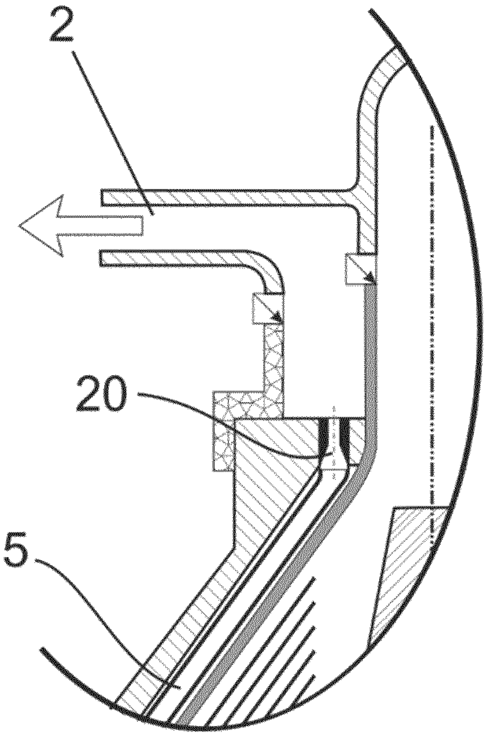
FIG. 2 illustrates a detail of an embodiment of the centrifugal separator according to the present invention.

In FIG. 1 the outlet conduits 5 are executed as pipes stretching out in the sludge space 12 to a diameter larger than the disc stack diameter. When clarifying beer the heavy phase flowing in the outlet conduits 5 is yeast concentrate.

The spindle 11 is hollow and has in its center parallel with the axis of rotation an inlet channel 4 for feeding the fluid mixture to be separated into said separator bowl 18. Said inlet channel 4 leads the fluid mixture to the distributor channels 19 which transport the fluid mixture from the center of the rotor out to the distributing holes 14 of the stack of conical separator discs 13. Clarified liquid is taken out from the center of the disc stack and leaves the separator by the liquid outlet 1 for discharge of a separated liquid light phase. The heavier concentrate and sediment goes to the sludge space 12. Concentrate and sediment can leave the sludge space 12 either by the second outlet 2 or by discharge ports for intermittent discharge 3. The opening and closing of the discharge ports 3 is managed by a hydraulically operated sliding bowl bottom 10.

The first and second outlet 1, 2 have mechanical seals 6*a*, 6*b*. As this is an airtight design, it is also often called hermetic seals. The inlet channel 4 also has a mechanical seal sealing between a stationary part of said inlet channel and a lower end of the hollow spindle 11, thus preventing communication between the inlet channel and the surroundings. This mechanical seal is not shown in this figure.

When adding the pressure drop caused by the nozzles 20 or vortex diodes 7 to the pressure drop in the outlet conduits 5 and the pressure needed to push the heavy phase concentrate against centrifugal force to the center of separator, it is advantageous to have the heavy phase outlet on a larger diameter of the centrifugal separator bowl than the light phase outlet. It is even preferable to have a heavy phase outlet mechanical seal with a diameter larger than normally, as when the diameter is set from flow rate considerations. It is particularly advantageous if the ratio between the radius of the heavy phase outlet mechanical seal, $R_{seal}$, and the outer radius of the disc stack 13, $R_{disc}$, is larger than 20%.

It is also possible to rearrange the design to have the inlet at the top of the separator and one of first or second outlet 1, 2 through the hollow spindle 11.

Figure 6:
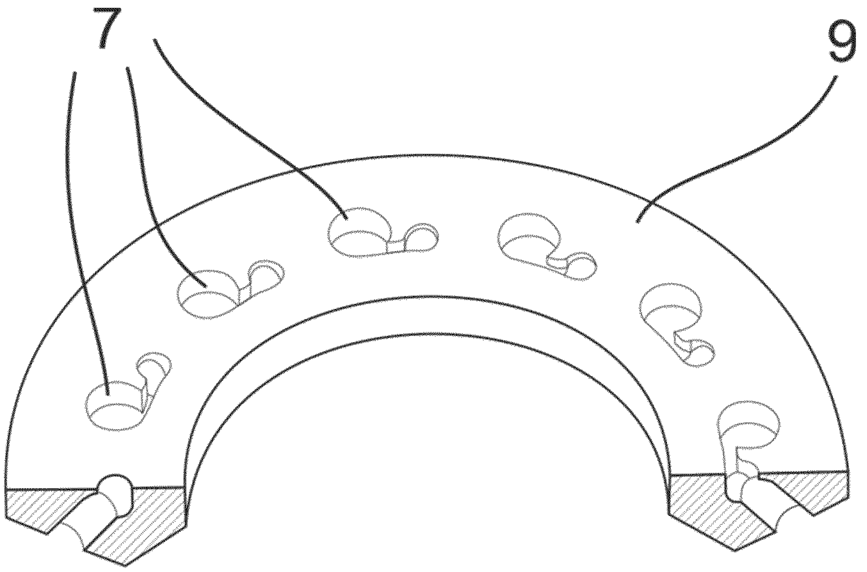
FIGS. 6 and 6*a* illustrate an embodiment of vortex nozzles according to the present invention.
Figure 6A:
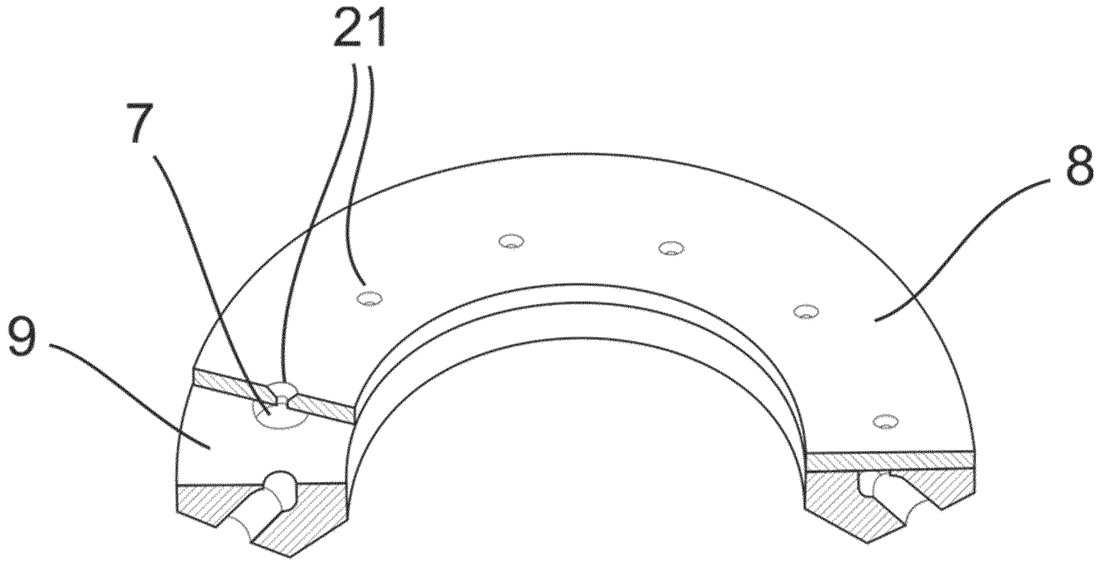

The vortex diodes 7 or nozzles 20 are exchangeable. This is for tuning to actual process demands. Having a number of vortex diode or nozzle inserts of different internal dimensions, it is easy to mix up sizes or to lose one of the tiny inserts. This can be avoided if the vortex diodes 7 are designed into a single piece as shown in FIG. 6. Here all the vortex chambers 7 are milled out in a ring piece 9. There is an arrangement of O-rings or gaskets to prevents leakage even though it is not shown in the FIG. 6. The same kind of arrangement can also be used for nozzles 20. The central bores 21 of the vortex diodes 7 are formed in an exchangeable ring 8 shown in FIG. 6*a*. There is an arrangement of O-rings or gaskets to prevent leakage even though it is not shown in the FIG. 6 or 6*a*. The same kind of arrangement can also be used for plain nozzles 20.

Figure 4:
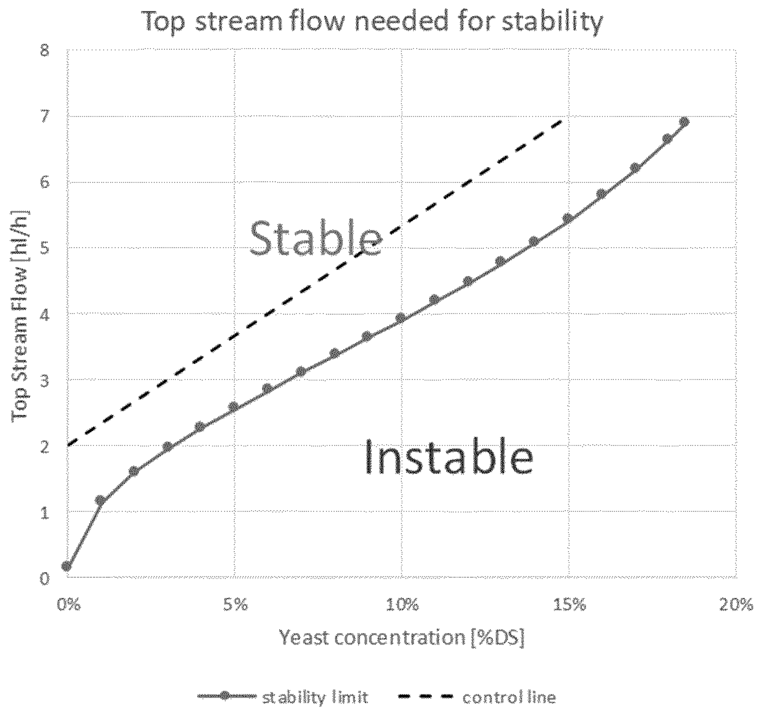
FIG. 4 illustrates a graph disclosing a desired operation mode.
Figure 5:
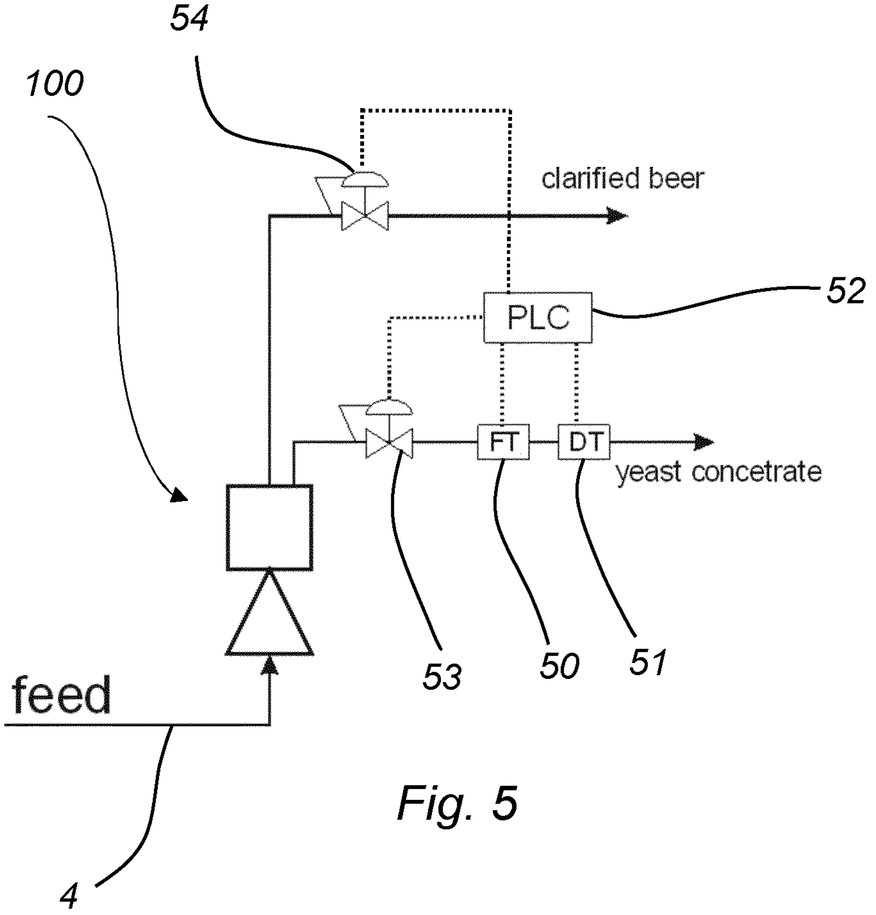
FIG. 5 illustrates a schematic view of a centrifugal separator system using the invention.

FIG. 4 shows a stability diagram with the second outlet flow rate and the concentration of yeast at the second outlet. Running the separator at a combination of second outlet flow rate and concentration in the instable region of the diagram leads to plugging of the outlet conduits 5. The diagram shows a dashed curve which represent stable operation without any clogging of the conduits. The line with dots on it is the stability limit curve under which there is a great risk of clogging of said conduits. This curve may be drawn up from experience. FIG. 5 shows a scheme of the centrifugal separator with control and regulation devices in an application for clarifying beer. Concentrate phase flow and density is measured by a flow transmitter 50 (FT) and a density transmitter 51 (DT) arranged in the second outlet 2 and the result signals are sent to a programmable logic controller 52 or PLC. The PLC 52 is receiving the signals from the flow transmitter 50 and the density transmitter 51 respectively.

The flow transmitter and the density transmitter may be substituted for a Coriolis type mass flow meter from which measurements both flow and density can be derived.

The PLC 52 is programmed to control a first control valve 53 arranged in the second hermetic outlet 2 for the heavy phase to keep the flow and density parameters in the stable area of the diagram in FIG. 4, preferably following the dashed line of FIG. 4. That is with some margin to the stability limit. The control line of FIG. 4 is drawn as a straight line, but it can also be a curve.

The PLC 52 may instead or also be programmed to control a second control valve 54 arranged in the first hermetic outlet 1 for the light phase.

The higher viability of the yeast/cell culture discharged by the second outlet makes it reusable for further fermentation, while cells leaving the separator through intermittent discharge are mostly dead. When reusing the concentrate in this way a lower concentration of the second outflow does not give a product loss of clarified first outlet liquid (beer).

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A centrifugal separator for clarification of a liquid mixture into a heavy phase and a light phase, comprising:

a centrifugal separator bowl rotatable around an axis and encasing a separation space, and a sludge space radially outward of said separation space;

a hermetic inlet for feeding a liquid mixture to said separation space;

a first hermetic outlet for a separated clarified light phase;

a second hermetic outlet for a separated heavy phase;

a plurality of outlet conduits extending from an outer position in said sludge space to said second hermetic outlet; and a ring having a bottom surface contacting a top surface of the centrifugal separator bowl and forming a plurality of flow restrictions extending from the bottom surface of the ring to a top surface of the ring, the plurality of flow restrictions communicating with the plurality of outlet conduits, wherein a diameter of the plurality of flow restrictions varies between the bottom surface of the ring and the top surface of the ring.

2. The centrifugal separator according to claim 1, wherein the plurality of outlet conduits are at least partly shaped as pipes.

3. The centrifugal separator according to claim 2, wherein a cross-section of the plurality of outlet conduits is circular.

4. The centrifugal separator according to claim 2, wherein the plurality of flow restrictions are in the form of exchangeable pieces.

5. The centrifugal separator according to claim 2, wherein the second hermetic outlet for heavy phase has a mechanical seal of larger diameter than a mechanical seal on the first hermetic outlet for light phase.

6. The centrifugal separator according to claim 1, wherein a cross-section of the plurality of outlet conduits is circular.

7. The centrifugal separator according to claim 1, wherein the plurality of flow restrictions are in the form of exchangeable pieces.

8. The centrifugal separator to claim 1, wherein the second hermetic outlet for heavy phase has a mechanical seal of larger diameter than a mechanical seal on the first hermetic outlet for light phase.

9. The centrifugal separator according to claim 8, wherein a ratio between a radius of the mechanical seal of the second hermetic outlet for heavy phase and an outer radius of a disc stack is larger than 20%.

10. The centrifugal separator according to claim 1, wherein the centrifugal separator bowl has a third outlet for intermittent discharge at a periphery of the centrifugal separator bowl thereof.

11. The centrifugal separator according to claim 1, wherein a control valve is arranged in the second hermetic outlet.

12. The centrifugal separator according to claim 11, wherein a control valve is arranged in the first hermetic outlet.

13. The centrifugal separator according to claim 11, wherein at least one measuring device is arranged in the second hermetic outlet measuring density and flow rate, the at least one measuring device being connected to a programmable logic controller (PLC) and being adapted to send data representing density and flow rate respectively, the programmable logic controller (PLC) being adapted to process the data to determine if the combination of values of flow rate and density lies within a predetermined scope of values corresponding to a stable flow through the plurality of outlet conduits or not, and wherein an actuator is adapted to manipulate one or both of said control valves in the first and second hermetic outlets in response to a correction signal sent by said programmable logic controller (PLC), if said combination of values of flow rate and density does not lie within said predetermined scope.

14. A method to control the centrifugal separator according to claim 1, in order to provide a stable flow through the plurality of outlet conduits, combinations of values of flow rate and density of the heavy phase is established where a stable flow through the plurality of outlet conduits are maintained, the flow rate and density of the heavy phase in said second hermetic outlet are measured continuously or intermittently and compared to said combinations of values by a programmable logic controller (PLC), the flow rate in said second hermetic outlet and/or said first hermetic outlet is regulated so a stable flow is maintained.

15. The method according to claim 14, wherein the programmable logic controller (PLC) is set to follow a curve corresponding to combinations of flow rate and density in said second hermetic outlet, with a margin to a stability limit curve, under which stability limit curve the plurality of conduits may clog.

16. The centrifugal separator according to claim 1, wherein the ring fits within a recess in the top surface of the centrifugal separator bowl.

17. The centrifugal separator according to claim 1, wherein the outlet conduits extend to the top surface of the centrifugal separator bowl, and wherein the plurality of flow restrictions align with the plurality of outlet conduits.

18. A centrifugal separator for clarification of a liquid mixture into a heavy phase and a light phase, having a centrifugal separator bowl rotatable around an axis and encasing a separation space, and a sludge space radially outward of said separation space, comprising:

a hermetic inlet for feeding a liquid mixture to said separation space;

a first hermetic outlet for a separated clarified light phase;

a second hermetic outlet for a separated heavy phase;

a plurality of outlet conduits extending from an outer position in said sludge space to said second hermetic outlet; and a ring forming a plurality of flow restrictions, the plurality of flow restrictions communicating with the plurality of outlet conduits, wherein the ring is formed by a ring piece having a plurality of inlets and an exchangeable ring having a plurality of outlets.

19. The centrifugal separator according to claim 18, wherein a plurality of vortex chambers are formed in the ring piece.

20. The centrifugal separator according to claim 19, wherein diameters of the plurality of outlets are less than diameters of the plurality of vortex chambers.

* * * * *